US012693747B2

(12) United States Patent
Liu et al.

(10) Patent No.: US 12,693,747 B2
(45) Date of Patent: Jul. 28, 2026

(54) MULTIMEDIA PRESENTATION METHOD, APPARATUS, READABLE MEDIA AND ELECTRONIC DEVICE

(71) Applicant: Beijing Youzhuju Network Technology Co., Ltd., Beijing (CN)

(72) Inventors: Ji Liu, Beijing (CN); Yu Sun, Beijing (CN); Jinming Zhang, Beijing (CN); Weijia Kong, Beijing (CN); Hao Lv, Beijing (CN); Jinhui Guo, Beijing (CN); Longfei Mu, Beijing (CN); Xue Yao, Beijing (CN); Biyu Guo, Beijing (CN); Ziqiong Yan, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/730,730

(22) PCT Filed: Jan. 9, 2023

(86) PCT No.: PCT/CN2023/071356
§ 371 (c)(1),
(2) Date: Jul. 19, 2024

(87) PCT Pub. No.: WO2023/138429
PCT Pub. Date: Jul. 27, 2023

(65) Prior Publication Data
US 2025/0231627 A1 Jul. 17, 2025

(30) Foreign Application Priority Data
Jan. 21, 2022 (CN) .......................... 202210074389.9

(51) Int. Cl.
*G06F 3/0346* (2013.01)
(52) U.S. Cl.
CPC ................................. *G06F 3/0346* (2013.01)

(58) Field of Classification Search
CPC ..................................................... G06F 3/0346
See application file for complete search history.

(56) References Cited

U.S. PATENT DOCUMENTS 8,531,571 B1 * 9/2013 Cote ...................... G06F 1/1686
348/333.12
2010/0042954 A1 * 2/2010 Rosenblatt ............ G06F 3/0482
715/863

(Continued)

FOREIGN PATENT DOCUMENTS

CN 103677580 A 3/2014
CN 104007902 A 8/2014

(Continued)

OTHER PUBLICATIONS

China National Intellectual Property Administration, Office Action and Search Report Issued in Application No. 202210074389.9, Jul. 15, 2023, 23 pages.

(Continued)

*Primary Examiner* — Ryan A Lubit
(74) *Attorney, Agent, or Firm* — Alleman Hall LLP

(57) ABSTRACT

The present disclosure relates to a multimedia presentation method, apparatus, readable medium and electronic device. The method comprises: in response to a user's rotation operation on a terminal, obtaining a rotation parameter of the terminal, the terminal presenting first multimedia data through a current page; in response to determining that the terminal rotates to a predetermined direction according to the rotation parameter, obtaining second multimedia data corresponding to the first multimedia data; switching a current page of the terminal to a target page and presenting the second multimedia data through the target page. In this way, without a click operation, it is able to switch to the target page through the rotation operation of the user, and present the second multimedia data corresponding to the first (Continued)

multimedia data, which improves the convenience and interest of the user's operation, thereby improving the user experience.

14 Claims, 5 Drawing Sheets

(56) References Cited

U.S. PATENT DOCUMENTS

| | | | | |
|---|---|---|---|---|
| 2010/0150522 A1* | 6/2010 | Schmehl | | G06F 3/04855 |
| | | | | 386/343 |
| 2012/0233565 A1* | 9/2012 | Grant | | G06F 3/0483 |
| | | | | 715/776 |
| 2016/0041680 A1* | 2/2016 | Chi | | G09G 5/14 |
| | | | | 345/173 |
| 2017/0139576 A1* | 5/2017 | Jeong | | G06F 3/0346 |
| 2019/0310702 A1* | 10/2019 | Shibagami | | G06F 3/0346 |
| 2019/0346933 A1* | 11/2019 | Medina | | G06F 1/1694 |
| 2020/0197825 A1* | 6/2020 | Bear | | H04N 21/47 |
| 2020/0401281 A1* | 12/2020 | Shu | | G06F 1/1694 |
| 2021/0072885 A1* | 3/2021 | Ranchal | | G06F 3/04847 |
| 2021/0082220 A1* | 3/2021 | Boerger | | B65G 69/2882 |
| 2022/0179552 A1* | 6/2022 | Burckel | | G06F 3/04883 |
| 2022/0345591 A1* | 10/2022 | Shau | | H04N 23/55 |

FOREIGN PATENT DOCUMENTS

| | | | |
|---|---|---|---|
| CN | 110147193 A | 8/2019 |
| CN | 110851202 A | 2/2020 |
| CN | 111045565 A | 4/2020 |
| CN | 111338537 A | 6/2020 |
| CN | 111610852 A | 9/2020 |
| CN | 111625238 A | 9/2020 |
| CN | 112073583 A | 12/2020 |
| CN | 113050863 A | 6/2021 |
| CN | 113115088 A | 7/2021 |
| CN | 113115093 A | 7/2021 |
| CN | 113132776 A | 7/2021 |
| CN | 113204656 A | 8/2021 |
| CN | 113407744 A | 9/2021 |
| CN | 113515647 A | 10/2021 |
| CN | 113535033 A | 10/2021 |
| CN | 114489336 A | 5/2022 |

OTHER PUBLICATIONS

China National Intellectual Property Administration, Office Action and Search Report Issued in Application No. 202210074389.9, Nov. 29, 2023, 23 pages.

* cited by examiner

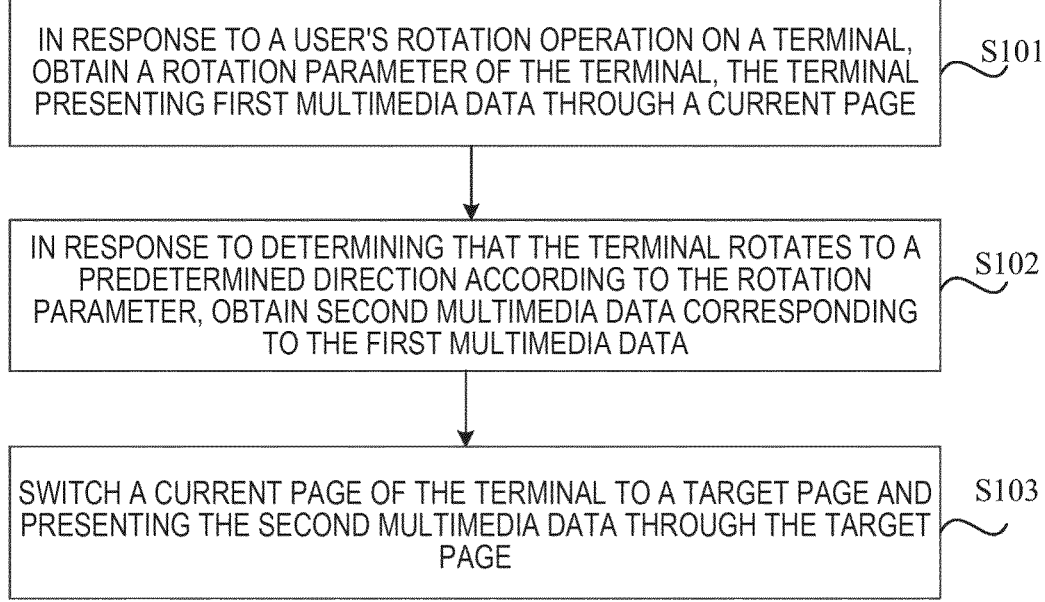

IN RESPONSE TO A USER'S ROTATION OPERATION ON A TERMINAL, OBTAIN A ROTATION PARAMETER OF THE TERMINAL, THE TERMINAL PRESENTING FIRST MULTIMEDIA DATA THROUGH A CURRENT PAGE — S101

IN RESPONSE TO DETERMINING THAT THE TERMINAL ROTATES TO A PREDETERMINED DIRECTION ACCORDING TO THE ROTATION PARAMETER, OBTAIN SECOND MULTIMEDIA DATA CORRESPONDING TO THE FIRST MULTIMEDIA DATA — S102

SWITCH A CURRENT PAGE OF THE TERMINAL TO A TARGET PAGE AND PRESENTING THE SECOND MULTIMEDIA DATA THROUGH THE TARGET PAGE — S103

FIG. 1

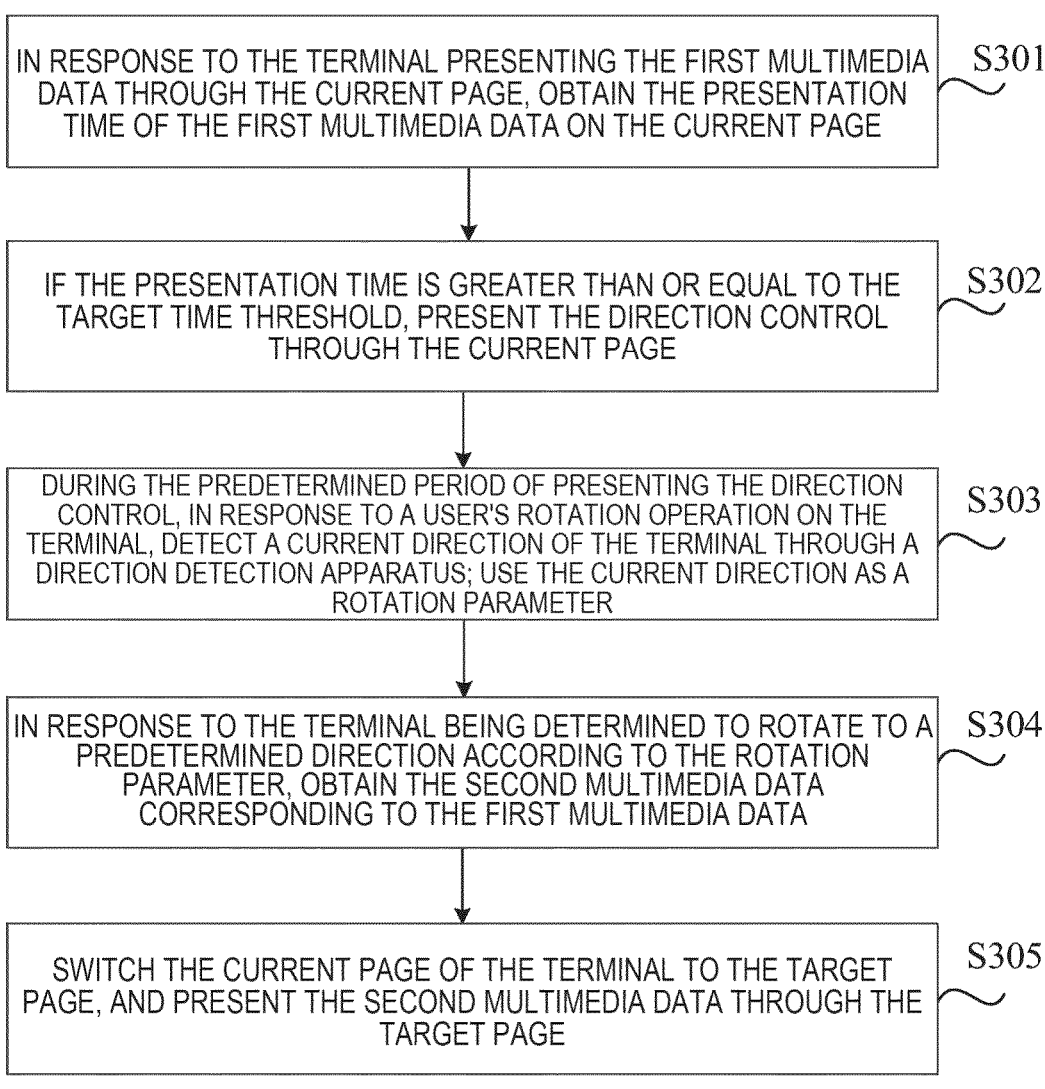

IN RESPONSE TO THE TERMINAL PRESENTING THE FIRST MULTIMEDIA DATA THROUGH THE CURRENT PAGE, OBTAIN THE PRESENTATION TIME OF THE FIRST MULTIMEDIA DATA ON THE CURRENT PAGE ⎯ S301

IF THE PRESENTATION TIME IS GREATER THAN OR EQUAL TO THE TARGET TIME THRESHOLD, PRESENT THE DIRECTION CONTROL THROUGH THE CURRENT PAGE ⎯ S302

DURING THE PREDETERMINED PERIOD OF PRESENTING THE DIRECTION CONTROL, IN RESPONSE TO A USER'S ROTATION OPERATION ON THE TERMINAL, DETECT A CURRENT DIRECTION OF THE TERMINAL THROUGH A DIRECTION DETECTION APPARATUS; USE THE CURRENT DIRECTION AS A ROTATION PARAMETER ⎯ S303

IN RESPONSE TO THE TERMINAL BEING DETERMINED TO ROTATE TO A PREDETERMINED DIRECTION ACCORDING TO THE ROTATION PARAMETER, OBTAIN THE SECOND MULTIMEDIA DATA CORRESPONDING TO THE FIRST MULTIMEDIA DATA ⎯ S304

SWITCH THE CURRENT PAGE OF THE TERMINAL TO THE TARGET PAGE, AND PRESENT THE SECOND MULTIMEDIA DATA THROUGH THE TARGET PAGE ⎯ S305

FIG. 3

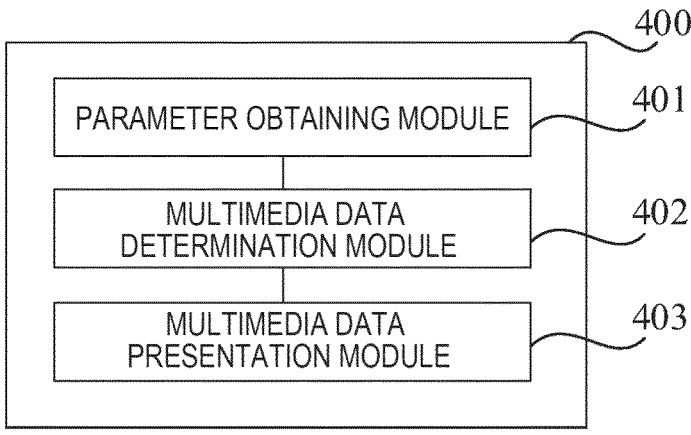

400

PARAMETER OBTAINING MODULE — 401

MULTIMEDIA DATA DETERMINATION MODULE — 402

MULTIMEDIA DATA PRESENTATION MODULE — 403

FIG. 4

MULTIMEDIA PRESENTATION METHOD, APPARATUS, READABLE MEDIA AND ELECTRONIC DEVICE

CROSS REFERENCE

This application is a national stage of the International application PCT/CN2023/071356, filed on Jan. 9, 2023. This International application claims priority to Chinese patent application No. 202210074389.9, entitled "MULTIMEDIA PRESENTATION METHOD, APPARATUS, READABLE MEDIA AND ELECTRONIC DEVICE" filed on Jan. 21, 2022. All of these applications are hereby incorporated by reference in their entireties.

FIELD

The present disclosure relates to Internet technology field, specifically, to a multimedia presentation method, apparatus, readable medium and electronic device.

BACKGROUND

With the popularization of terminal devices such as mobile phones and tablets and the continuous development of Internet technology, presenting multimedia data through terminal APPs (Applications) has become a common way to promote multimedia content. In related technologies, users can browse the introduction page of multimedia content through the terminal APP, and then click the corresponding button or link to enter the detailed page corresponding to the introduction page. However, the operation using this method is relatively monotonous and the user experience is not good.

SUMMARY

This summary section is provided to introduce in brief form the ideas that are described in detail in the detailed description section that follows. This summary section is not intended to identify key features or essential features of the claimed technical solution, nor is it intended to be used to limit the scope of the claimed technical solution.

In a first aspect, the present disclosure provides a multimedia presentation method, comprising:

in response to a user's rotation operation on a terminal, obtaining a rotation parameter of the terminal, the terminal presenting first multimedia data through a current page;

in response to determining that the terminal rotates to a predetermined direction according to the rotation parameter, obtaining second multimedia data corresponding to the first multimedia data;

switching a current page of the terminal to a target page and presenting the second multimedia data through the target page.

Optionally, in response to a user's rotation operation on a terminal, obtaining a rotation parameter of the terminal comprises:

presenting a direction control through the current page, the direction control comprising a current direction of a terminal and the predetermined direction;

during a predetermined period of presenting the direction control, in response to a user's rotation operation on the terminal, detecting a current direction of the terminal through a direction detection apparatus;

using the current direction as the rotation parameter.

Optionally, determining that the terminal rotates to a predetermined direction according to the rotation parameter comprises:

if the current direction is in consistent with the predetermined direction, determining that the terminal rotates to the predetermined direction.

Optionally, presenting a direction control through the current page comprises:

obtaining a presentation time of the first multimedia data on the current page;

if the presentation time is greater than or equal to a target time threshold, presenting the direction control through the current page.

Optionally, the method further comprises:

presenting the presentation time through the current page.

Optionally, presenting the presentation time through the current page comprises:

presenting a timing control through the current page, the timing control being used to present presentation time of the first multimedia data.

Optionally, it is determined that the terminal rotates to a predetermined direction according to the rotation parameter, the method further comprising:

presenting predetermined notification information through the current page; the predetermined notification information comprising one or more of the following: a vibration notification, a sound notification and a light notification;

switching a current page of the terminal to a target page and presenting the second multimedia data through the target page comprises:

after presenting the predetermined notification information, switching the current page of the terminal to the target page and presenting the second multimedia data through the target page.

Optionally, in response to a user's rotation operation on a terminal, obtaining a rotation parameter of the terminal, the terminal presenting first multimedia data through a current page comprises:

in response to the terminal presenting the first multimedia data through the current page, presenting target notification information through the current page, the target notification information being used to notify a user to perform a rotation operation on the terminal;

in response to the user's rotation operation on the terminal according to the target notification information, obtaining the rotation parameter of the terminal.

In a second aspect, the present disclosure provides a multimedia presentation apparatus, which comprises:

a parameter obtaining module, configured to obtain a rotation parameter of the terminal in response to a user's rotation operation on the terminal, a terminal presenting first multimedia data through a current page;

a multimedia data determination module, configured to obtain second multimedia data corresponding to the first multimedia data in response to determining the terminal rotates to a predetermined direction according to the rotation parameter;

a multimedia data presentation module, configured to switch a current page of the terminal to a target page, and presenting the second multimedia data through the target page.

Optionally, the parameter obtaining module is configured to present a direction control through the current page, the direction control comprising a current direction of a terminal and the predetermined direction; during a predetermined period of presenting the direction control, in response to a user's rotation operation on the terminal, detecting a current direction of the terminal through a direction detection apparatus; use the current direction as the rotation parameter.

Optionally, the apparatus further comprises:

A direction determination module, configured to determine that the terminal rotates to the predetermined direction if the current direction is in consistent with the predetermined direction.

Optionally, the parameter obtaining module, configured to obtain a presentation time of the first multimedia data on the current page; if the presentation time is greater than or equal to a target time threshold, present the direction control through the current page.

Optionally, the apparatus further comprises:

a time presentation module, configured to present the presentation time through the current page.

Optionally, the time presentation module is configured to present a timing control through the current page, the timing control being used to present the presentation time of the first multimedia data.

Optionally, the multimedia data presentation module is configured to present predetermined notification information through the current page; the predetermined notification information comprise one or more of the following: a vibration notification, a sound notification and a light notification; after presenting the predetermined notification information, switch a current page of the terminal to a target page and presenting the second multimedia data through the target page.

Optionally, the parameter obtaining module is configured to present target notification information through the current page, in response to the terminal presenting the first multimedia data through the current page, the target notification information being used to notify a user to perform a rotation operation on the terminal; obtain the rotation parameter of the terminal, in response to the user's rotation operation on the terminal according to the target notification information.

In a third aspect, the present disclosure provides a computer-readable medium having a computer program stored thereon, wherein the program implements steps of the method described in the first aspect of the present disclosure in response to being executed by a processing apparatus.

In a fourth aspect, the present disclosure provides an electronic device, comprising:

a storage apparatus having a computer program stored thereon;

a processing apparatus, configured to execute the computer program in the storage apparatus to implement steps of the method described in the first aspect of the present disclosure.

Using the above technical solution, in response to a user's rotation operation on a terminal, obtain a rotation parameter of the terminal, the terminal presenting first multimedia data through a current page; in response to determining that the terminal rotates to a predetermined direction according to the rotation parameter, obtain second multimedia data corresponding to the first multimedia data; switch a current page of the terminal to a target page and presenting the second multimedia data through the target page. In this way, without a click operation, it is able to switch to the target page through the rotation operation, and present the second multimedia data corresponding to the first multimedia data, which improves the convenience and interest of the user's operation, thereby improving the user experience.

Other features and advantages of the present disclosure will be detailed in the detailed description section that follows.

BRIEF DESCRIPTION OF THE DRAWINGS

The above and other features, advantages and aspects of various embodiments of the present disclosure will become more apparent with reference to the following detailed description in conjunction with the accompanying drawings. Throughout the drawings, the same or similar reference numbers refer to the same or similar elements. It is to be understood that the drawings are schematic, and that elements and elements are not necessarily drawn to scale. In the accompanying drawings:

FIG. 1 is a flow chart of a multimedia presentation method according to an exemplary embodiment.

FIG. 3 is a flowchart of another multimedia presentation method according to an exemplary embodiment.

FIG. 4 is a block diagram of a multimedia presentation apparatus according to an exemplary embodiment.

DETAILED DESCRIPTION

Figure 2:
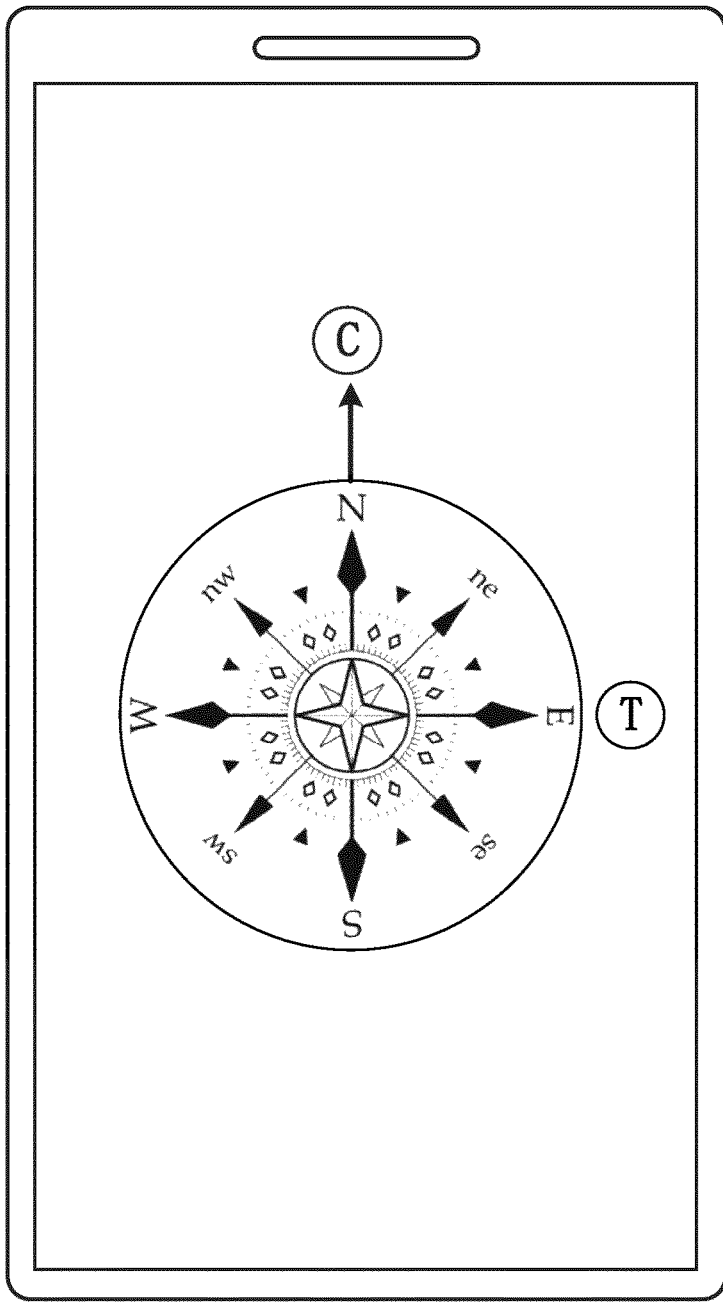
FIG. 2 is a schematic diagram of a directional control according to an exemplary embodiment.

Embodiments of the present disclosure will be described in more detail below with reference to the accompanying drawings. Although certain embodiments of the disclosure are shown in the drawings, it should be understood that the disclosure may be embodied in various forms and should not be construed as limited to the embodiments set forth herein, but rather these embodiments are provided for thoroughness and clarity to fully understand this disclosure. It should be understood that the drawings and embodiments of the present disclosure are for illustrative purposes only and are not intended to limit the scope of the present disclosure.

It should be understood that various steps described in the method implementations of the present disclosure may be executed in different orders and/or in parallel. Furthermore, method embodiments may include additional steps and/or omit performance of illustrated steps. The scope of the present disclosure is not limited in this regard.

As used herein, the term "comprise" and its variations are open-ended, ie, "comprising but not limited to." The term "based on" means "based at least in part on." The term "an embodiment" means "at least one embodiment"; the term "another embodiment" means "at least one further embodiment"; the term "embodiments" means "at least some embodiments". Relevant definitions of other terms will be given in the description below.

It should be noted that concepts such as "first" and "second" mentioned in this disclosure are only used to distinguish different devices, modules or units, and are not used to limit the dependence relationship between these devices and the order of functions performed by these devices, modules or units.

It should be noted that the modifications of "one" and "plurality" mentioned in this disclosure are illustrative and not restrictive. Those skilled in the art will understand that unless the context clearly indicates otherwise, it should be understood as "one or multiple".

The names of messages or information exchanged between multiple devices in the embodiments of the present disclosure are for illustrative purposes only and are not used to limit the scope of these messages or information.

First, the application scenarios of the present disclosure will be described. The present disclosure can be applied to multimedia presentation scenarios. In related technologies, users can browse the introduction page of multimedia content through the terminal APP, and then click the corresponding button or link to present the detailed page corresponding to the introduction page, so as to view detailed information. However, the operation of presenting detailed pages by clicking buttons or links is relatively monotonous, making it difficult to motivate users and resulting in poor user experience.

In order to solve the above problems, the present disclosure provides a multimedia presentation method, apparatus, readable medium and electronic device. In response to the user's rotation operation of the terminal, upon determining that the terminal is rotated to a predetermined direction, switch to the target page, and present the second multimedia data corresponding to the first multimedia data through the target page, improving the convenience and interest of user operations, thereby improving the user experience.

DETAILED DESCRIPTION of the present disclosure will be described in detail below with reference to the accompanying drawings.

FIG. 1 is a multimedia presentation method according to an exemplary embodiment. As shown in FIG. 1, the method comprises:

Step 101: In response to a user's rotation operation on a terminal, obtain a rotation parameter of the terminal, the terminal presenting first multimedia data through a current page.

Step 102: In response to determining that the terminal rotates to a predetermined direction according to the rotation parameter, obtain second multimedia data corresponding to the first multimedia data.

Step 103: Switch a current page of the terminal to a target page and presenting the second multimedia data through the target page.

The first multimedia data may be multimedia data selected by the user upon using the terminal APP, or may be multimedia data actively pushed to the user by the terminal APP. The second multimedia data may be more detailed multimedia data corresponding to the first multimedia data. For example, the first multimedia data can be the title, introduction data or guidance data of the second multimedia data, and the key information of the second multimedia data can be presented to the user. If the user chooses to further view the more detailed second multimedia data according to the presented key information, a rotation operation may be done to the terminal; conversely, if the user chooses not to view further, the user may not perform the rotation operation or directly click to view other multimedia data.

In another example of the present disclosure, the above step 101 may obtain the rotation parameter of the terminal through:

in response to the terminal presenting the first multimedia data through the current page, presenting target notification information through the current page; in response to the user's rotation operation on the terminal according to the target notification information, obtaining the rotation parameter of the terminal.

The above described target notification information is used to notify a user to perform a rotation operation on the terminal. For example, the target notification information may be text notification information, such as the text "Please rotate the terminal to view detailed information", or the target notification information can also be a multimedia notification message, such as an image or animation of rotating the terminal by hand.

In this way, the user can be notified to perform a rotation operation through the target notification information, such that the second multimedia data can be presented according to the rotation operation.

If the user performs a rotation operation on the terminal, the rotation parameters of the terminal can be obtained in response to the user's rotation operation on the terminal. The rotation parameter may include the current orientation of the terminal.

For example, the current direction of the terminal can be detected by the direction detection apparatus of the terminal. The current direction can be the direction pointed by a specific component of the terminal. For example, the specific component can be the top of the screen of the terminal. If the top of the screen points to the east, then the current direction of the terminal can be east; if the top of the screen points west, the current direction is west. After obtaining the current direction, you can use the current direction as a rotation parameter.

The predetermined direction may be any one of eight directions including east, west, south, north, southeast, northeast, southwest, and northwest. For example, it may be east. The predetermined direction may also include multiple directions, such as east and southeast, or east and south. In this way, if the current direction of the terminal is the same as any one of the plurality of predetermined directions, it can be determined that the terminal rotates to the predetermined direction.

Further, the above-mentioned rotation parameters may also include the rotation angle and rotation direction of the terminal, wherein the rotation direction may include left or right, and the rotation angle may be any angle between 0 degree and 360 degrees, depending on the initial direction, the rotation angle and rotation direction of the terminal, it is also able to determine the current direction of the terminal.

It should be noted that the multimedia data may be images, videos, animations, text, sounds, etc., which is not limited in this disclosure.

Using the above method, in response to a user's rotation operation on a terminal, obtain a rotation parameter of the terminal, the terminal presenting first multimedia data through a current page; in response to determining that the terminal rotates to a predetermined direction according to the rotation parameter, obtain second multimedia data corresponding to the first multimedia data; switch a current page of the terminal to a target page and presenting the second multimedia data through the target page. In this way, without a click operation, it is able to switch to the target page through the rotation operation and presenting the second multimedia data corresponding to the first multimedia data, which improves the convenience and interest of the user's operation, thereby improving the user experience.

In another embodiment of the present disclosure, in the above step 101, the rotation parameters of the terminal can be obtained through:

firstly, present the direction control through the current page.

Secondly, during the predetermined period of presenting the direction control, in response to the user's rotation operation of the terminal, the current direction of the terminal is detected by the direction detection apparatus.

Finally, use this current direction as a rotation parameter.

FIG. 2 is a schematic diagram of a direction control according to an exemplary embodiment. As shown in FIG.

2, the direction control can include the current direction C and the predetermined direction T of the terminal. The current direction C shown in FIG. 2 is "North", the predetermined direction Tis "East".

It should be noted that the above-mentioned direction detection device may include a geomagnetic sensor, which may include a Hall element made of a material sensitive to magnetic fields. The geomagnetic sensor may detect the current direction of the terminal through the geomagnetic field and the Hall element.

Further, the direction detection apparatus may also include a gyroscope and/or a gravity acceleration sensor, through which the direction detected by the geomagnetic sensor is corrected.

In this way, the user can be notified to rotate the terminal to the predetermined direction, so that the terminal is rotated in the predetermined direction, which further improves the convenience and interest of user operations.

FIG. 3 is another multimedia presentation method according to an exemplary embodiment. As shown in FIG. 3, the method comprises:

Step 301: in response to the terminal presenting the first multimedia data through the current page, obtain the presentation time of the first multimedia data on the current page.

Furthermore, after obtaining the presentation time, the presentation time can also be presented on the current page.

For example, a timing control can be presented on the current page, and the timing control is used to present the presentation time of the first multimedia data. The timing control may be a long progress bar, a circular timing progress bar, or a countdown time number, and the present disclosure does not limit this.

Step 302: If the presentation time is greater than or equal to the target time threshold, present the direction control through the current page.

For example, the target time threshold can be any time greater than 1 second, for example, it can be 3 seconds. In this way, in response to the presentation time being greater than or equal to 3 seconds, the direction control can be presented on the current page.

The direction control may include the current direction and the predetermined direction of the terminal, and may also include a rotation indication identification. The rotation indication identification is used to indicate the relative direction which the terminal needs to be rotated to in order to rotate the terminal to the predetermined direction. For example, the rotation indication identification may be an arrow pointing from the current direction to a predetermined direction.

Step 303: During the predetermined period of presenting the direction control, in response to a user's rotation operation on the terminal, detect a current direction of the terminal through a direction detection apparatus; use the current direction as a rotation parameter.

Step 304: In response to the terminal being determined to rotate to a predetermined direction according to the rotation parameter, obtain the second multimedia data corresponding to the first multimedia data.

Step 305: Switch the current page of the terminal to the target page, and present the second multimedia data through the target page.

In this way, the above methods may further enrich user interaction methods and improve user experience.

In another embodiment of the present disclosure, upon determining that the terminal is rotated to a predetermined direction according to the rotation parameter, the predetermined notification information may be presented through the current page; after the predetermined notification information is presented, the current page of the terminal is switched to the target page, and present the second multimedia data through the target page.

The predetermined notification information includes one or more of a vibration notification, a sound notification and a light notification.

For example, physical vibration or predetermined sound can be used to notify the user that the terminal has rotated to the predetermined direction and is about to switch the page.

In this way, notifying the user through predetermined notification information can further improve the convenience of user operations.

FIG. 4 is a block diagram of a multimedia presentation apparatus according to exemplary embodiments. As shown in FIG. 4, the multimedia presentation apparatus includes:

a parameter obtaining module 401, configured to obtain a rotation parameter of the terminal in response to a user's rotation operation on the terminal, a terminal presenting first multimedia data through a current page;

a multimedia data determination module 402, configured to obtain second multimedia data corresponding to the first multimedia data in response to determining the terminal rotates to a predetermined direction according to the rotation parameter;

a multimedia data presentation module 403, configured to switch a current page of the terminal to a target page, and presenting the second multimedia data through the target page.

Optionally, the parameter obtaining module 401 is used to present a direction control through the current page. The direction control includes the current direction of the terminal and the predetermined direction; during the predetermined period of presenting the direction control, in response to the user's rotation operation for the terminal, detect the current direction of the terminal through the direction detection apparatus; the current direction is used as the rotation parameter.

Optionally, the parameter obtaining module 401 is used to present target notification information through the current page in response to the terminal presenting the first multimedia data through the current page, and the target notification information is used to notify the user to perform a rotation operation on the terminal; in response to the user's rotation operation on the terminal according to the target notification information, obtain the rotation parameters of the terminal.

Figure 5:
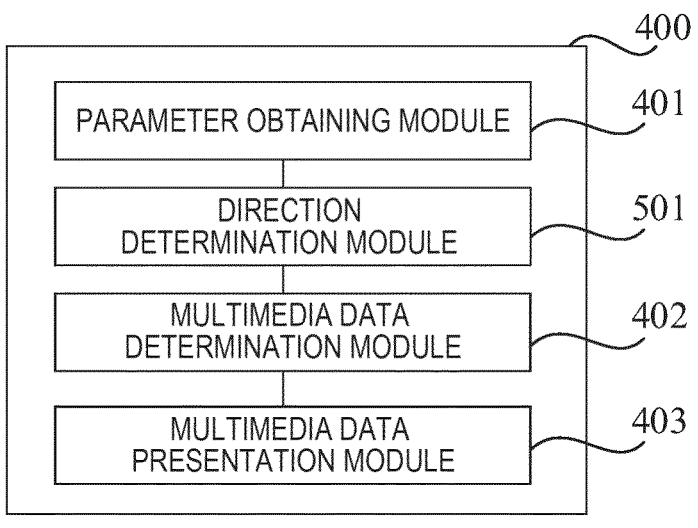
FIG. 5 is a block diagram of another multimedia presentation apparatus according to an exemplary embodiment.

FIG. 5 is a block diagram of another multimedia presentation apparatus according to an exemplary embodiment. As shown in FIG. 5, the multimedia presentation apparatus also includes:

the direction determination module 501, configured to determine that the terminal rotates to the predetermined direction if the current direction is in consistent with the predetermined direction.

Optionally, the parameter obtaining module 401 is used to obtain the presentation time of the first multimedia data on the current page; in response the presentation time being greater than or equal to the target period threshold, present the direction control through the current page.

Figure 6:
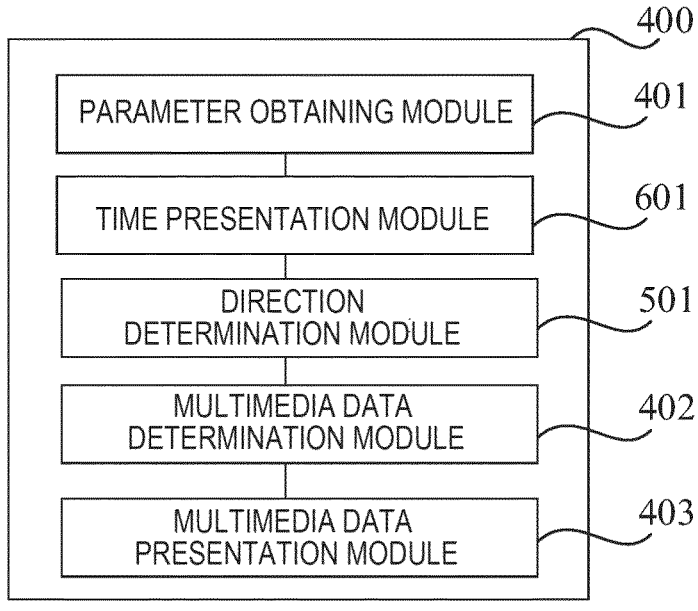
FIG. 6 is a block diagram of another multimedia presentation apparatus according to an exemplary embodiment.

FIG. 6 is a block diagram of another multimedia presentation apparatus according to an exemplary embodiment. As shown in FIG. 6, the multimedia presentation apparatus also includes:

the time presentation module 601 is used to presentation the presentation time through the current page.

Optionally, the time presentation module 601 is used to present a timing control through the current page, and the timing control is used to present the presentation time of the first multimedia data.

Optionally, the multimedia data presentation module 403 is configured to present predetermined notification information through the current page; the predetermined notification information includes one or more of a vibration notification, a sound notification and a light notification; after presenting the predetermined notification information, switch the current page of the terminal to the target page, and present the second multimedia data through the target page.

Figure 7:
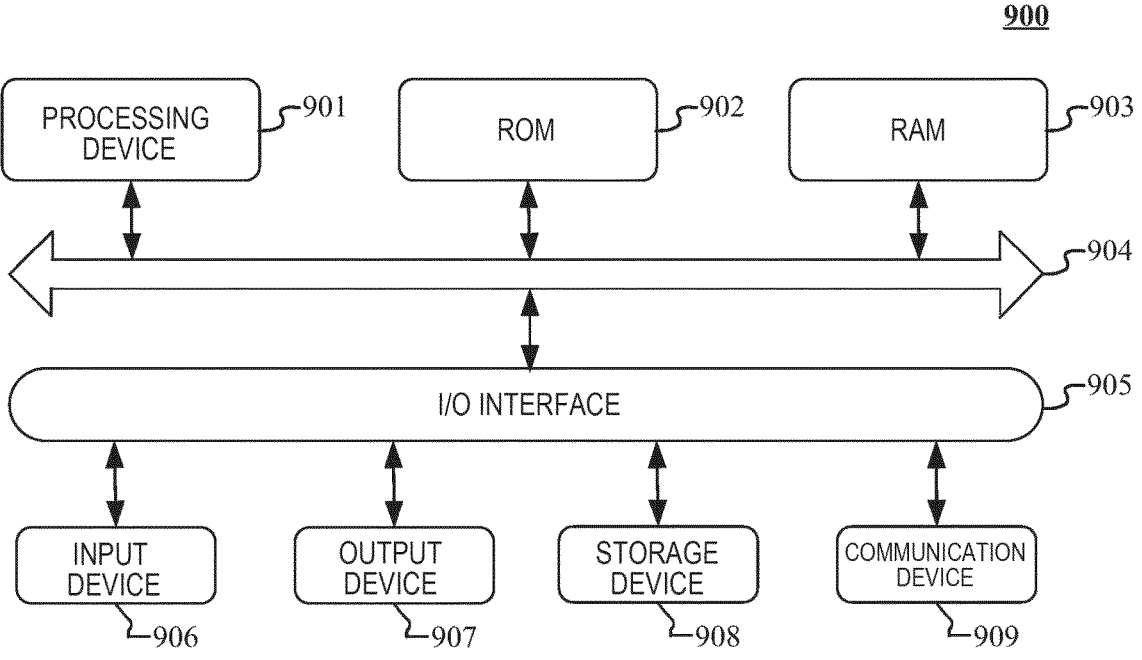
FIG. 7 is a block diagram of an electronic device according to an exemplary embodiment.

Referring now to FIG. 7, a schematic structural diagram of an electronic device (such as a terminal device or a server) 900 suitable for implementing embodiments of the present disclosure is shown. Terminal devices in embodiments of the present disclosure may include, but are not limited to, mobile phones, notebook computers, digital broadcast receivers, PDAs (personal digital assistants), PADs (tablet computers), PMPs (portable multimedia players), vehicle-mounted terminals (such as vehicle-mounted navigation terminals) and fixed terminals such as digital TVs, desktop computers, etc. The electronic device shown in FIG. 7 is only an example and should not bring any limitations to the functions and usage scope of the embodiments of the present disclosure.

As shown in FIG. 7, the electronic device 900 may include a processing device (eg, central processing unit, graphics processor, etc.) 901, which may execute various appropriate actions and processes according to the program stored in a read-only memory (ROM) 902 or a program loaded from a storage device 908 to the random access memory (RAM) 903. In the RAM 903, various programs and data required for the operation of the electronic device 900 are also stored. The processing device 901, the ROM 902 and the RAM 903 are connected to each other via a bus 904. An input/output (I/O) interface 905 is also connected to bus 904.

Generally, the following devices may be connected to the I/O interface 905: input devices 906 including, for example, a touch screen, touch pad, keyboard, mouse, camera, microphone, accelerometer, gyroscope, etc.; output devices 907 including, for example, a liquid crystal display (LCD), speaker, vibrator; a storage device 908 including a magnetic tape, a hard disk, etc.; and a communication device 909. The communication device 909 may allow the electronic device 900 to communicate wirelessly or wiredly with other devices to exchange data. Although FIG. 7 illustrates electronic device 900 with various means, it should be understood that implementation or availability of all illustrated means is not required. More or fewer means may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer-readable medium, the computer program containing program code for performing the method illustrated in the flowchart. In such embodiments, the computer program can be downloaded and installed from the network via the communication device 909, or installed from the storage device 908, or installed from the ROM 902. When the computer program is executed by the processing device 901, the above-mentioned functions defined in the method of embodiments of the present disclosure are performed.

It should be noted that the computer-readable medium mentioned above in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. More specific examples of computer readable storage media may include, but are not limited to: an electrical connection having one or more wires, a portable computer disk, a hard drive, random access memory (RAM), read only memory (ROM), erasable programmable read-only memory (EPROM or flash memory), optical fiber, portable compact disk read-only memory (CD-ROM), optical storage device, magnetic storage device, or any suitable combination of the above. In this disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program code embodied on a computer-readable medium may be transmitted using any suitable medium, including but not limited to: wire, optical fiber cable, RF (radio frequency), etc., or any suitable combination of the foregoing.

In some embodiments, the client and server can communicate using any currently known or future developed network protocol such as HTTP (HyperText Transfer Protocol), and can interconnect with digital data communications (e.g., communications networks) in any form or medium. Examples of communications networks include local area networks ("LAN"), wide area networks ("WAN"), the internet (e.g., the Internet), and end-to-end networks (e.g., ad hoc end-to-end networks), as well as any currently known or future developed network.

The above-mentioned computer-readable medium may be included in the above-mentioned electronic device; it may also exist independently without being assembled into the electronic device.

The computer-readable medium carries one or more programs. When the one or more programs are executed by the electronic device, causing the electronic device to: in response to a user's rotation operation on a terminal, obtain a rotation parameter of the terminal, the terminal presenting first multimedia data through a current page; in response to determining that the terminal rotates to a predetermined direction according to the rotation parameter, obtain second multimedia data corresponding to the first multimedia data; switch a current page of the terminal to a target page and presenting the second multimedia data through the target page.

Computer program code for performing the operations of the present disclosure may be written in one or more programming languages, including but not limited to object-oriented programming languages—such as Java, Smalltalk, C++, and includes conventional procedural programming languages—such as "C" or similar programming languages. The program code may execute entirely on the user's computer, partly on the user's computer, as a stand-alone software package, partly on the user's computer and partly on a remote computer or entirely on the remote computer or server. In situations involving remote computers, the remote computer can be connected to the user's computer through any kind of network, including a local area network (LAN) or a wide area network (WAN), or it can be connected to an external computer (such as with an Internet service provider, connected via the Internet).

The flowcharts and block diagrams in the accompanying drawings illustrate the architecture, functionality, and operations of systems, methods, and computer program products that may be implemented in accordance with various embodiments of the present disclosure. In this regard, each block in the flowchart or block diagram may represent a module, segment, or portion of code that contains one or more logic functions that implement the specified executable instructions. It should also be noted that, in some alternative implementations, the functions noted in the block may occur out of the order noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented by special purpose hardware-based systems that perform the specified functions or operations, or can be implemented using a combination of specialized hardware and computer instructions.

The modules involved in the embodiments described in this disclosure can be implemented in software or hardware. Wherein, the name of the module does not constitute a limitation on the module itself under certain circumstances. For example, the parameter obtaining module can also be described as "in response to a user's rotation operation on a terminal, obtaining a rotation parameter of the terminal, the terminal presenting first multimedia data through a current page."

The functions described above herein may be performed, at least in part, by one or more hardware logic components. For example, and without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical device (CPLD) and so on.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, apparatus or devices, or any suitable combination of the foregoing. More specific examples of machine-readable storage media would include electrical connections based on one or more wires, laptop disks, hard drives, random access memory (RAM), read only memory (ROM), erasable programmable read only memory (EPROM or flash memory), optical fiber, portable compact disk read-only memory (CD-ROM), optical storage device, magnetic storage device, or any suitable combination of the above.

According to one or more embodiments of the present disclosure, Example 1 provides a multimedia presentation method, the method includes:

in response to a user's rotation operation on a terminal, obtaining a rotation parameter of the terminal, the terminal presenting first multimedia data through a current page;

in response to determining that the terminal rotates to a predetermined direction according to the rotation parameter, obtaining second multimedia data corresponding to the first multimedia data;

switching a current page of the terminal to a target page and presenting the second multimedia data through the target page.

According to one or more embodiments of the present disclosure, Example 2 provides the method described in Example 1, wherein in response to a user's rotation operation on the terminal, obtaining the rotation parameter of the terminal includes:

presenting a direction control through the current page, the direction control comprising a current direction of a terminal and the predetermined direction;

during a predetermined period of presenting the direction control, in response to a user's rotation operation on the terminal, detecting a current direction of the terminal through a direction detection apparatus;

using the current direction as the rotation parameter.

According to one or more embodiments of the present disclosure, Example 3 provides the method described in Example 2, wherein determining that the terminal rotates to a predetermined direction according to the rotation parameter comprises:

if the current direction is in consistent with the predetermined direction, determining that the terminal rotates to the predetermined direction.

According to one or more embodiments of the present disclosure, Example 4 provides the method described in Example 2, wherein presenting a direction control through the current page comprises:

obtaining a presentation time of the first multimedia data on the current page;

if the presentation time is greater than or equal to a target time threshold, presenting the direction control through the current page.

In accordance with one or more embodiments of the present disclosure, Example 5 provides the method of Example 4, the method further comprising:

presenting the presentation time through the current page.

According to one or more embodiments of the present disclosure, Example 6 provides the method described in Example 5, wherein presenting the presentation time through the current page comprises:

presenting a timing control through the current page, the timing control being used to present presentation time of the first multimedia data.

According to one or more embodiments of the present disclosure, Example 7 provides the method described in any one of Examples 1 to 6, wherein it is determined that the terminal rotates to a predetermined direction according to the rotation parameter, the method further comprising:

presenting predetermined notification information through the current page; the predetermined notification information comprising one or more of the following: a vibration notification, a sound notification and a light notification;

wherein switching a current page of the terminal to a target page and presenting the second multimedia data through the target page comprises:

after presenting the predetermined notification information, switching the current page of the terminal to the target page and presenting the second multimedia data through the target page.

According to one or more embodiments of the present disclosure, Example 8 provides the method described in any one of Examples 1 to 6, wherein in response to a user's rotation operation on a terminal, obtaining a rotation parameter of the terminal, the terminal presenting first multimedia data through a current page comprises:

in response to the terminal presenting the first multimedia data through the current page, presenting target notification information through the current page, the target notification information being used to notify a user to perform a rotation operation on the terminal;

in response to the user's rotation operation on the terminal according to the target notification information, obtaining the rotation parameter of the terminal.

According to one or more embodiments of the present disclosure, Example 9 provides a multimedia presentation apparatus, wherein the apparatus comprises:

a parameter obtaining module, configured to obtain a rotation parameter of the terminal in response to a user's rotation operation on the terminal, a terminal presenting first multimedia data through a current page;

a multimedia data determination module, configured to obtain second multimedia data corresponding to the first multimedia data in response to determining the terminal rotates to a predetermined direction according to the rotation parameter;

a multimedia data presentation module, configured to switch a current page of the terminal to a target page, and presenting the second multimedia data through the target page.

According to one or more embodiments of the present disclosure, Example 10 provides the apparatus described in Example 9, the parameter obtaining module is used to present a direction control through the current page, and the direction control comprises the current direction of the terminal and the predetermined direction; during a predetermined period of presenting the direction control, in response to a user's rotation operation on the terminal, detect a current direction of the terminal through a direction detection apparatus; use the current direction as the rotation parameter.

According to one or more embodiments of the present disclosure, Example 11 provides the apparatus of Example 10, the apparatus further comprising:

A direction determination module, configured to determine that the terminal rotates to the predetermined direction if the current direction is in consistent with the predetermined direction.

According to one or more embodiments of the present disclosure, Example 12 provides the apparatus described in Example 10, the parameter obtaining module is used to obtain the presentation time of the first multimedia data on the current page; if the presentation time is greater than or equal to a target time threshold, presenting the direction control through the current page.

According to one or more embodiments of the present disclosure, Example 13 provides the apparatus of Example 12, the apparatus further comprising:

a time presentation module, configured to present the presentation time through the current page.

According to one or more embodiments of the present disclosure, Example 14 provides the device of Example 13, the time presentation module is used to present a timing control through the current page, and the timing control is used to present the presentation time of the first multimedia data.

According to one or more embodiments of the present disclosure, Example 15 provides the apparatus described in any one of Examples 9 to 14, the multimedia data presentation module is configured to present predetermined notification information through the current page; the predetermined notification information comprising one or more of the following: a vibration notification, a sound notification and a light notification; after presenting the predetermined notification information, switching the current page of the terminal to the target page and presenting the second multimedia data through the target page.

According to one or more embodiments of the present disclosure, Example 16 provides the apparatus described in any one of Examples 9 to 14, and the parameter obtaining module is used to in response to the terminal presenting the first multimedia data through the current page, present target notification information through the current page, the target notification information being used to notify the user to perform a rotation operation on the terminal; in response to the user's rotation operation on the terminal according to the target notification information, obtain the rotation parameter of the terminal.

The above description is only a description of the preferred embodiments of the present disclosure and the technical principles used. Those skilled in the art should understand that the disclosure scope involved in the present disclosure is not limited to technical solutions composed of specific combinations of the above technical features, but should also cover solutions composed of the above technical features or other technical solutions formed by any combination of equivalent features without departing from the above disclosed concept. For example, a technical solution is formed by replacing the above features with technical features with similar functions disclosed in this disclosure (but not limited to).

Furthermore, although operations are depicted in a specific order, this should not be understood as requiring that these operations be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features described in the context of individual embodiments may also be implemented in combination in a single embodiment. Conversely, various features that are described in the context of a single embodiment can also be implemented in multiple embodiments individually or in any suitable sub-combination.

Although the present subject matter has been described in language specific to structural features and/or methodological logical acts, it should be understood that the subject matter defined in the accompanying claims is not necessarily limited to the specific features or actions described above. Rather, the specific features and actions described above are merely example forms of implementing claims. Regarding the apparatus in the above embodiments, the specific manner in which each module performs operations has been described in detail in the embodiments related to the method, and will not be elaborated here.

What is claimed is:

1. A multimedia presentation method, comprising:

in response to a user's rotation operation on a terminal, obtaining a rotation parameter of the terminal, the terminal presenting first multimedia data through a current page;

in response to determining that the terminal rotates to a predetermined direction according to the rotation parameter, obtaining second multimedia data corresponding to the first multimedia data; and switching a current page of the terminal to a target page and presenting the second multimedia data through the target page, wherein the target page is different from the current page, and the second multimedia data is different from the first multimedia data, wherein in response to the user's rotation operation on the terminal, obtaining the rotation parameter of the terminal comprises:

presenting a direction control through the current page, the direction control comprising a current direction of a terminal and the predetermined direction;

during a predetermined period of presenting the direction control, in response to the user's rotation operation on the terminal, detecting a current direction of the terminal through a direction detection apparatus; and using the current direction as the rotation parameter, wherein presenting the direction control through the current page comprises:

obtaining a presentation time of the first multimedia data on the current page; and if the presentation time is greater than or equal to a target time threshold, presenting the direction control through the current page, and wherein the direction control includes rotation indication identification, including an arrow pointing from the current direction to a predetermined direction.

2. The method of claim 1, wherein determining that the terminal rotates to the predetermined direction according to the rotation parameter comprises:

if the current direction is consistent with the predetermined direction, determining that the terminal rotates to the predetermined direction.

3. The method of claim 1, wherein the method further comprises:

presenting the presentation time through the current page.

4. The method of claim 3, wherein presenting the presentation time through the current page comprises:

presenting a timing control through the current page, the timing control being used to present presentation time of the first multimedia data.

5. The method of claim 1, wherein it is determined that the terminal rotates to the predetermined direction according to the rotation parameter, the method further comprising:

presenting predetermined notification information through the current page; the predetermined notification information comprising one or more of the following: a vibration notification, a sound notification and a light notification;

wherein switching a current page of the terminal to a target page and presenting the second multimedia data through the target page comprises:

after presenting the predetermined notification information, switching the current page of the terminal to the target page and presenting the second multimedia data through the target page.

6. The method of claim 1, wherein in response to the user's rotation operation on the terminal, obtaining the rotation parameter of the terminal, the terminal presenting first multimedia data through a current page comprises:

in response to the terminal presenting the first multimedia data through the current page, presenting target notification information through the current page, the target notification information being used to notify a user to perform a rotation operation on the terminal; and in response to the user's rotation operation on the terminal, obtaining the rotation parameter of the terminal.

7. The method of claim 1, wherein the direction control comprises a rotation indication identification, the rotation indication identification being used to indicate a relative direction which the terminal needs to rotate to in order to rotate the terminal to the predetermined direction.

8. A non-transitory computer-readable medium having a computer program stored thereon, wherein, in response to being executed by a processing apparatus, the program implements steps of a method comprising:

in response to a user's rotation operation on a terminal, obtaining a rotation parameter of the terminal, the terminal presenting first multimedia data through a current page;

in response to determining that the terminal rotates to a predetermined direction according to the rotation parameter, obtaining second multimedia data corresponding to the first multimedia data; and switching a current page of the terminal to a target page and presenting the second multimedia data through the target page, wherein the target page is different from the current page, and the second multimedia data is different from the first multimedia data, wherein in response to the user's rotation operation on the terminal, obtaining the rotation parameter of the terminal comprises:

presenting a direction control through the current page, the direction control comprising a current direction of a terminal and the predetermined direction;

during a predetermined period of presenting the direction control, in response to the user's rotation operation on the terminal, detecting a current direction of the terminal through a direction detection apparatus; and using the current direction as the rotation parameter, wherein presenting the direction control through the current page comprises:

obtaining a presentation time of the first multimedia data on the current page; and if the presentation time is greater than or equal to a target time threshold, presenting the direction control through the current page, and wherein the direction control includes rotation indication identification, including an arrow pointing from the current direction to a predetermined direction.

9. The non-transitory computer-readable medium according to claim 8, the method further comprising:

if the current direction is consistent with the predetermined direction, determining that the terminal rotates to the predetermined direction.

10. The non-transitory computer-readable medium according to claim 8, the method further comprising:

presenting the presentation time through the current page.

11. The non-transitory computer-readable medium according to claim 8, the method further comprising:

presenting a timing control through the current page, the timing control being used to present presentation time of the first multimedia data.

12. The non-transitory computer-readable medium according to claim 8, the method further comprising:

presenting predetermined notification information through the current page; the predetermined notification information comprising one or more of the following: a vibration notification, a sound notification and a light notification;

wherein switching a current page of the terminal to a target page and presenting the second multimedia data through the target page comprises:

after presenting the predetermined notification information, switching the current page of the terminal to the target page and presenting the second multimedia data through the target page.

13. The non-transitory computer-readable medium according to claim 8, the method further comprising:

in response to the terminal presenting the first multimedia data through the current page, presenting target notification information through the current page, the target notification information being used to notify a user to perform a rotation operation on the terminal; and in response to the user's rotation operation on the terminal, obtaining the rotation parameter of the terminal.

14. An electronic device, comprising:

a storage apparatus having a computer program stored thereon;

a processing apparatus, configured to execute the computer program in the storage apparatus to implement steps of a method comprising:

in response to a user's rotation operation on a terminal, obtaining a rotation parameter of the terminal, the terminal presenting first multimedia data through a current page;

in response to determining that the terminal rotates to a predetermined direction according to the rotation parameter, obtaining second multimedia data corresponding to the first multimedia data; and switching a current page of the terminal to a target page and presenting the second multimedia data through the target page, wherein the target page is different from the current page, and the second multimedia data is different from the first multimedia data, wherein in response to the user's rotation operation on the terminal, obtaining the rotation parameter of the terminal comprises:

presenting a direction control through the current page, the direction control comprising a current direction of a terminal and the predetermined direction;

during a predetermined period of presenting the direction control, in response to the user's rotation operation on the terminal, detecting a current direction of the terminal through a direction detection apparatus; and using the current direction as the rotation parameter, wherein presenting the direction control through the current page comprises:

obtaining a presentation time of the first multimedia data on the current page; and if the presentation time is greater than or equal to a target time threshold, presenting the direction control through the current page, and wherein the direction control includes rotation indication identification, including an arrow pointing from the current direction to a predetermined direction.

* * * * *